(12) United States Patent
Nourse et al.

(10) Patent No.: US 12,015,305 B2
(45) Date of Patent: Jun. 18, 2024

(54) BRANCH CIRCUIT EMERGENCY LIGHTING TRANSFER SWITCH UTILIZING RELAY CONTROLS AND SAFETY RELAY FOR LOAD POWER CONTROL

(71) Applicant: SIGNIFY HOLDING B.V., Eindhoven (NL)

(72) Inventors: James Nourse, Eindhoven (NL); Tom Stoll, Eindhoven (NL); Madan Venn, Eindhoven (NL); Mohammad Amini, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 113 days.

(21) Appl. No.: 17/778,440

(22) PCT Filed: Nov. 20, 2020

(86) PCT No.: PCT/EP2020/082824
§ 371 (c)(1),
(2) Date: May 20, 2022

(87) PCT Pub. No.: WO2021/099537
PCT Pub. Date: May 27, 2021

(65) Prior Publication Data
US 2022/0416569 A1    Dec. 29, 2022

Related U.S. Application Data

(60) Provisional application No. 63/022,763, filed on May 11, 2020, provisional application No. 62/938,643, filed on Nov. 21, 2019.

(30) Foreign Application Priority Data

May 22, 2020   (EP) .................................... 20175957

(51) Int. Cl.
  *H02J 9/06* (2006.01)
  *H05B 47/105* (2020.01)
(52) U.S. Cl.
  CPC ............ *H02J 9/065* (2013.01); *H05B 47/105* (2020.01)
(58) Field of Classification Search
  CPC .................................. H02J 9/15; H02J 9/065
  (Continued)

(56) References Cited

U.S. PATENT DOCUMENTS

2013/0106190 A1   5/2013   Lin et al.
2013/0187470 A1   7/2013   Huang et al.
(Continued)

FOREIGN PATENT DOCUMENTS

EP   2811617 A1   12/2014
GB   2520418 B    11/2016
WO   2012162457 A2   11/2012

*Primary Examiner* — Joseph Chang

(57) ABSTRACT

A device, system and method for sequenced switching of a transfer switch. The method includes receiving a first monitoring signal indicating either one of an actuation of a fire alarm system or a first change of state in a primary power source from an on state to an off state. The method includes opening a first control relay connected to the primary power source and a second control relay connected to the secondary power source. The method further includes switching a safety relay from a first connection to the primary power source to a second connection to the secondary power source. The method further includes closing the first and second control relays so that the secondary power source energizes the lighting load.

14 Claims, 2 Drawing Sheets

(58) Field of Classification Search
USPC .......................................................... 307/125
See application file for complete search history.

(56) References Cited

U.S. PATENT DOCUMENTS

| | | |
|---|---|---|
| 2015/0214785 A1 | 7/2015 | Jagjitpati et al. |
| 2015/0256028 A1 | 9/2015 | Suman |
| 2017/0033598 A1* | 2/2017 | Shen ........................ H02J 9/065 |
| 2017/0244274 A1 | 8/2017 | Ewing et al. |
| 2019/0067990 A1 | 2/2019 | Hermans |

* cited by examiner

BRANCH CIRCUIT EMERGENCY LIGHTING TRANSFER SWITCH UTILIZING RELAY CONTROLS AND SAFETY RELAY FOR LOAD POWER CONTROL

CROSS-REFERENCE TO PRIOR APPLICATIONS

This application is the U.S. National Phase application under 35 U.S.C. § 371 of International Application No. PCT/EP2020/082824, filed on Nov. 20, 2020, which claims the benefit of U.S. Provisional Application No. 63/022,763, filed on May 11, 2020, which claims the benefit of U.S. Provisional Application No. 62/938,643 filed on Nov. 21, 2019, which claims the benefit of European Patent Application No. 20175957.8, filed on May 22, 2020. These applications are hereby incorporated by reference herein.

BACKGROUND INFORMATION

A transfer switch (or device) is used to switch a circuit from one source of power to another. For example, a circuit operating on mains voltage as a primary power source may lose the mains voltage and switch to a secondary power source. A transfer switch may change the power source from the primary source to the secondary source, allowing the circuit to continue to operate. The secondary source is typically called an emergency source, often from a generator or inverter (with a storage battery). Operation of the transfer switch may occur automatically or manually. When the transfer occurs, the secondary (or emergency) source will power the load directly in its current state, whether other controls, such as a wall switch or dimming control (in the case of lighting loads), are turned on or off. Furthermore, the transfer switch must be capable of connecting the secondary source, e.g. the generator or inverter, to the load from the mains voltage without causing damage to any internal components, whether the two power sources are synchronized or not.

US2019067990A1 relates to an automatic transfer switch for transferring the electrical power supplied to a load between a primary power source and a secondary power source employs one SPST bistable relay, and two SPDT bistable relays to switch power between regular and emergency sources. A fourth relay, a SPDT relay, is optionally employed to direct power from the emergency source to emergency lighting fixtures so that emergency lighting is provided despite the presence of dimming circuits or switched off circuits or the like.

In the case of emergency lighting, there exists a special subset of transfer switches that are able to safely perform the switch and also be able to provide adequate controls to bring the path of egress illumination to sufficient levels to meet NFPA 101 Life Safety Code (LSC) requirements. These devices are called Branch Circuit Emergency Lighting Transfer Switches, or BCELTS. Even though BCELTS devices are limited to lighting circuits of 20 A or less, they must still meet the requirements of the UL 1008 Automatic Transfer Switch standard. For example, these devices are designed to meet the rigorous requirements involved in passing the UL 1008 Overload, Endurance and Short-Circuit Withstand Tests. These requirements include a capacity for 50 cycles at three times the rated current of the device (for the Overload Test) as well as thousands of cycles at twice the rated current (for the Endurance Test). In addition, the Short Circuit Withstand Test must be performed at a minimum of 5000 A. The UL 1008 standard also requires the main switching relay to be equipped with an interlock mechanism (safety relay) that prevents its dual contacts from switching if either of them become welded in one position or the other. In most cases, meeting all these requirements cannot be achieved by simply using a suitably rated relay with the interlock mechanism, especially if the device is intended to be designed as physically small as possible. This requires other switching components to control when the safety relay is exposed to the high currents and voltages present when switching between two asynchronous power sources.

SUMMARY

Some exemplary embodiments are directed to a method that includes receiving a first monitoring signal indicating either one of an actuation of a fire alarm system or a first change of state in a primary power source from an on state to an off state, the on state comprising the primary power source providing a voltage sufficient to power a load and the off state comprising the primary power source not providing a voltage sufficient to power the load. The method further includes opening a first control relay connected to the primary power source and a second control relay connected to the secondary power source,
  switching a safety relay from a first connection to the primary power source to a second connection to the secondary power source, and closing the first and second control relays.

Further exemplary embodiments are directed to a device including a microcontroller configured to receive a first monitoring signal indicating either one of an actuation of a fire alarm system or a first change of state in a primary power source from an on state to an off state, the on state comprising the primary power source providing a voltage sufficient to power a load and the off state comprising the primary power source not providing a voltage sufficient to power the load. The device further includes a first control relay connected to the primary power source, a second control relay connected to the secondary power source, and a safety relay connected to both the primary power source and the secondary power source. The microcontroller is further configured to open the first and second control relays, switch the safety relay from a first connection to the primary power source to a second connection to the secondary power source, and close the first and second control relays.

Still other exemplary embodiments are directed to a microcontroller including circuitry for receiving a first monitoring signal indicating either one of an actuation of a fire alarm system or a first change of state in a primary power source from an on state to an off state, the on state comprising the primary power source providing a voltage sufficient to power a load and the off state comprising the primary power source not providing a voltage sufficient to power the load. The microcontroller further includes circuitry for opening a first control relay connected to the primary power source and a second control relay connected to the secondary power source, circuitry for switching a safety relay from a first connection to the primary power source to a second connection to the secondary power source, and circuitry for closing the first and second control relays.

DETAILED DESCRIPTION

Figure 1:
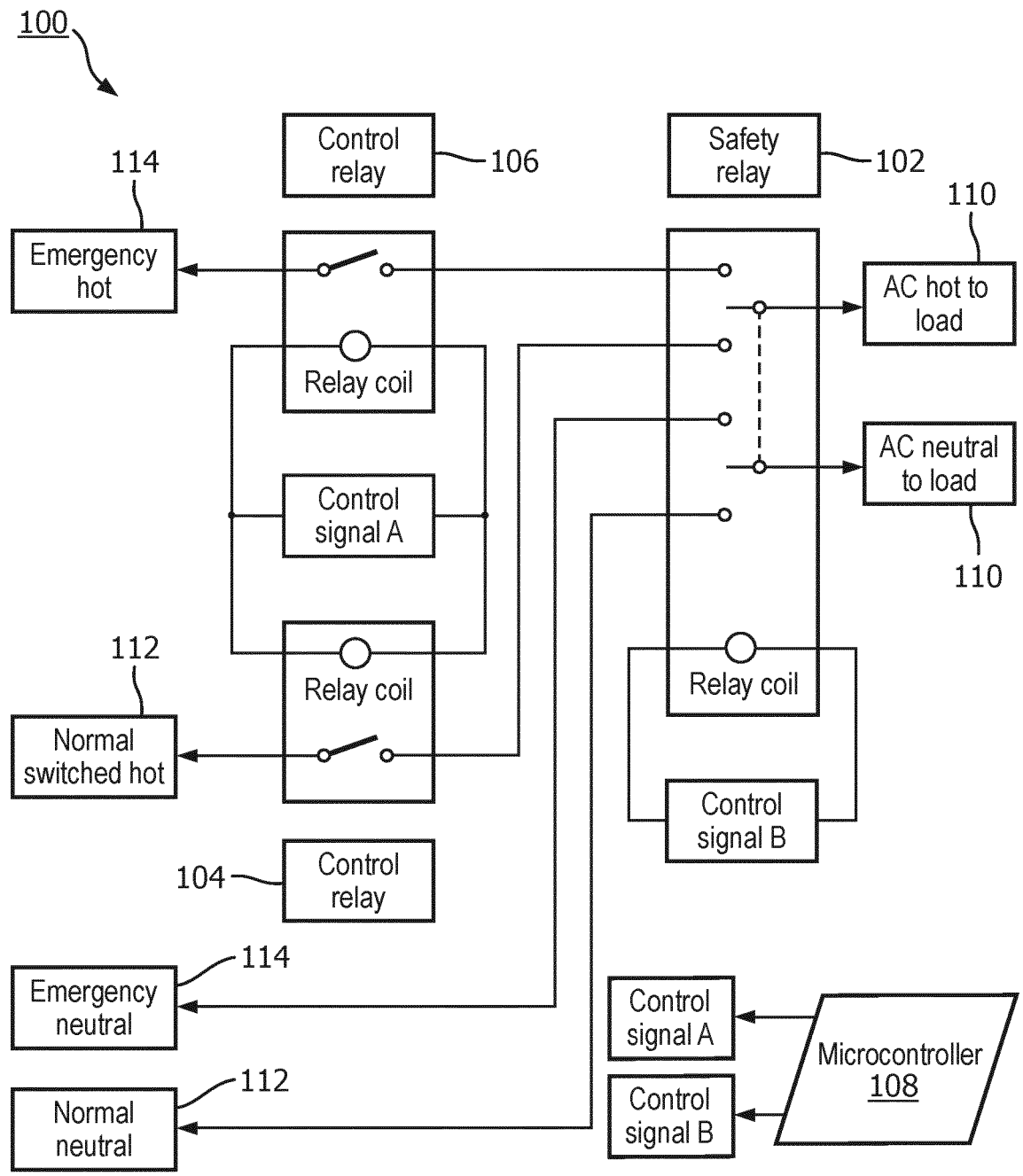
FIG. 1 shows a device i.e. a transfer switch for switching a lighting load from a primary power source to a secondary power source including a single safety relay and two control relays sequentially controlled by a microcontroller.

The exemplary embodiments may be further understood with reference to the following description and the related appended drawings, wherein like elements are provided with the same reference numerals. The exemplary embodiments are related to a device and method for load power control at a branch circuit emergency lighting transfer switch (BCELTS) utilizing relay controls and a safety relay.

The exemplary embodiments relate to scenarios where a safety relay may be exposed to the high currents and voltages present when switching between two asynchronous power sources. The exemplary device comprises supplementary control relays and sequenced switching of the control relays with the safety relay using a microcontroller. The exemplary embodiments describe a single safety relay connected with two control relays that switch sequentially to limit the high currents and voltages present during the transfer from the normal power source to the emergency power source and back again when normal power is restored. A microcontroller, associated software and control circuitry implement the sequential timing necessary to meet the UL 1008 standard requirements and may be used as a Listed BCELTS device to provide emergency lighting from a backup source.

The exemplary embodiments describe a reliable way to achieve optimal performance with respect to meeting the rigorous requirements of UL 1008 testing. The sequentially controlled supplementary relays for reducing the current and voltage present at the safety relay permits the use of a smaller safety relay (with respect to its electrical ratings and physical size) to meet the interlock requirements of UL 1008 while also creating a switching scheme to protect the device from the high currents and voltages present with switching between two asynchronous power sources. For example, a transfer switch such as the Signify® GTD20A includes the interlock mechanism discussed above and a larger relay but is suitably sized (larger contacts and spacing between contacts) so as not to need a protection scheme as discussed herein.

FIG. 1 shows a device 100, e.g., a transfer switch for switching a lighting load 110 from a primary power source 112 to a secondary power source 114 including a single safety relay 102 and two control relays 104, 106 sequentially controlled by a microcontroller 108. The primary power source 112 may be a mains voltage power source that is used during normal operation of the load 110. However, if the primary source 112 becomes unavailable or otherwise inadequate, the device 100 is operable to switch to an emergency secondary source 114, e.g. a generator or inverter, to temporarily power the load 110 until the primary source 112 resumes. Additionally, the device 100 is operable to switch to the emergency secondary source 114 to temporarily power the load 110 when the device 100 senses the actuation of a fire alarm system.

The microcontroller 108 is connected to primary source monitoring circuitry (not pictured) and configured to process a monitoring signal received therefrom indicating a voltage drop or resumption at the primary source 110 and operate the safety and control relays 102, 104, 106 accordingly. In addition to the monitoring circuitry for the primary source, the device 100 may have provisions to interface with a fire alarm system, e.g. monitoring circuitry for the fire alarm system. The fire alarm system may, for example, use a 24 VDC battery to function. The device 100, via the fire alarm system interface, may sense the fire alarm system has been actuated via a 24 VDC fire alarm signal and implement the switching sequence to power the load via the secondary source in response thereto, even when the primary source remains energized. In a similar manner, the device 100 may sense when the fire alarm system has turned off and may switch back to the primary source in response thereto.

A first control signal, e.g., Control Signal A, transmitted from the microcontroller 108 operates the control relays 104, 106. The first control relay 104 is connected to the hot lead of the primary power source 112 and comprises a relay coil configured to either open or close a switch to prevent or allow a current to flow from the primary power source 112. The first control relay 104 may be normally closed so that, in the absence of a control voltage applied to the relay coil, current is allowed to flow from the primary power source 112. A second control relay 106 is connected to the hot lead of the secondary power source 114 and comprises a relay coil configured to either open or close a switch to prevent or allow a current to flow from the secondary power source 112. The second control relay 106, similar to the first control relay 104, may be normally closed so that, in the absence of a control voltage applied to the relay coil, current is allowed to flow from the secondary power source 114. The safety relay 102 provides a switching functionality between the primary source 112 and the secondary source 114 when the first and second control relays 104, 106 are open, i.e. not connected. The microcontroller further comprises control circuitry (not pictured) to sustain the microcontroller power supply without the primary or secondary sources connected.

A second control signal, e.g., Control Signal B, transmitted from the microcontroller 108 operates the safety relay 102. The safety relay 102 is connected to the load 110 and to both the hot lead and the neutral lead of both of the primary source 112 and the secondary source 114. The safety relay 102 comprises a relay coil configured to either open or close a switch to allow a current from either the primary source 112 or the secondary source 114.

The primary source 112 may change state from an on state, e.g., providing a voltage sufficient to power the load, to an off state, e.g., providing no voltage or a voltage insufficient to power the load 110, or may change state from the off state to the on state.

Figure 2:
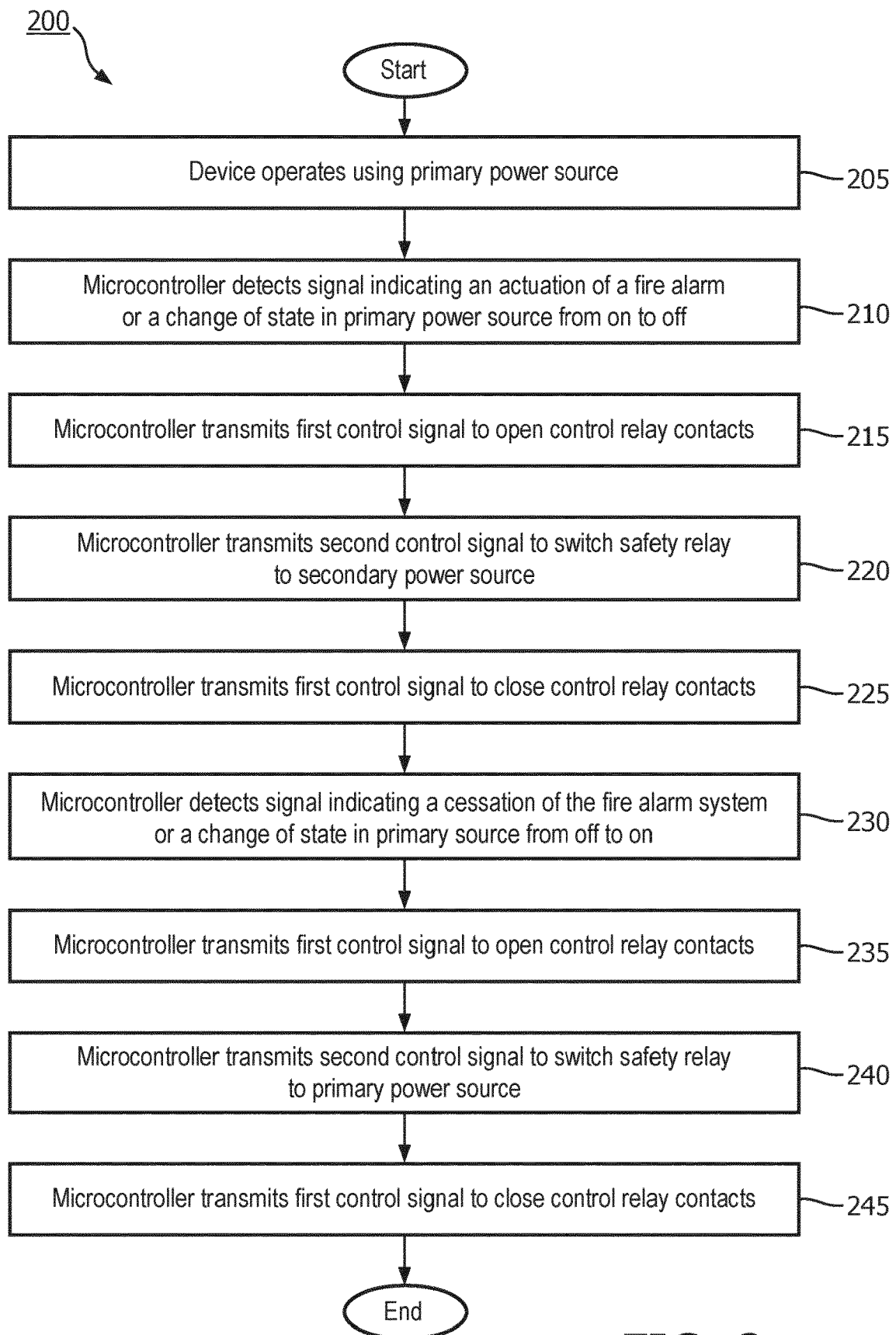
FIG. 2 shows a method for controlling a transfer switch to switch a lighting load from a primary power source to a secondary power source.

FIG. 2 shows a method 200 for controlling a transfer switch to switch a lighting load from a primary power source to a secondary power source. In 205, a transfer switch, e.g. the device 100, enters into an operating state connected to the primary power source, e.g. primary source 112, for powering a load, e.g. the lighting load 110. The primary source is in the on state, e.g., provides a voltage sufficient to power the load. A safety relay connected to the load, e.g. the safety relay 102, is closed when the transfer switch is operating on the primary power source. The safety relay is configured to switch from the primary source powering the load (when energized) to a secondary power source powering the load (when de-energized).

In 210, a microcontroller, e.g. the microcontroller 108, detects a signal indicating a change of state in the primary power source from the on state to an off state, e.g., not providing a voltage sufficient to power the load. The detection signal may be provided by the monitoring circuitry for the primary source discussed above. Alternatively, as discussed above, the microcontroller 108 may detect an actuation of a fire alarm system via a fire alarm monitoring signal that may also act to trigger the switching procedure detailed below.

In 215, the microcontroller transmits a first control signal, e.g. Control Signal A, to open control relay contacts for a first control relay connected to the hot lead of the primary source, e.g. the first control relay 104, and for a second control relay connected to the hot lead of a secondary power source, e.g. the second control relay 106. By opening both control relays, the current and voltage present at the safety relay is reduced.

In 220, the microcontroller transmits a second control signal, e.g. Control Signal B, to open the safety relay and switch the safety relay from the primary source to the secondary source. In 225, after switching the safety relay, the microcontroller again transmits the first control signal. In this instance, the first control signal closes the control relays connected to the primary source and the secondary source. Accordingly, the secondary source now powers the load.

In 230, the microcontroller again detects a signal from the monitoring circuitry indicating a change of state in the primary power source, in this instance from the off state to the on state. As detailed above, the microcontroller may alternatively sense the cessation of the fire alarm system via the fire alarm system interface. In 235, the microcontroller transmits the first control signal to open the control relay contacts and reduce the voltage and current at the safety relay. In 240, the microcontroller transmits the second control signal to close the safety relay and switch the safety relay from the secondary source to the primary source. In 245, the microcontroller transmits the first control signal to close the control relays connected to the primary source and the secondary source. Accordingly, the first source again powers the load.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
   receiving a first monitoring signal indicating either one of an actuation of a fire alarm system or a first change of state in a primary power source from an on state to an off state, the on state comprising the primary power source providing a voltage sufficient to power a lighting load and the off state comprising the primary power source not providing a voltage sufficient to power the lighting load;
   opening a first control relay connected to the primary power source and a second control relay connected to the secondary power source;
   switching a safety relay from a first position, connecting the primary power source to power the lighting load, to a second position, connecting the secondary power source to power the lighting load; and
   closing the first and second control relays.

2. The method of claim 1, further comprising:
   receiving a second monitoring signal indicating either one of a cessation of the fire alarm system or a second change of state in the primary power source from the off state to the on state;
   opening the first and second control relays;
   switching the safety relay from the second connection to the first connection; and
   closing the first and second control relays.

3. The method of claim 1, wherein a first control signal opens the first and second control relays.

4. The method of claim 3, wherein a second control signal switches the safety relay.

5. The method of claim 1, wherein the primary power source comprises mains voltage and the secondary power source comprises a generator or an inverter.

6. The method of claim 1, wherein the first and second control relays each comprise a control relay coil actuating a control switch for allowing or preventing a current flow.

7. The method of claim 6, wherein the safety relay comprises a safety relay coil actuating a safety switch for allowing a current flow from the primary power source or a current flow from the secondary power source.

8. A device, comprising:
   a microcontroller configured to receive a first monitoring signal indicating either one of an actuation of a fire alarm system or a first change of state in a primary power source from an on state to an off state, the on state comprising the primary power source providing a voltage sufficient to power a lighting load and the off state comprising the primary power source not providing a voltage sufficient to power the lighting load;
   a first control relay connected to the primary power source;
   a second control relay connected to the secondary power source; and
   a safety relay connected to both the primary power source and the secondary power source, wherein the microcontroller is further configured to open the first and second control relays, switch the safety relay from a first position, connecting the primary power source to power the lighting load, to a second position, connecting the secondary power source to power the lighting load, and close the first and second control relays.

9. The device of claim 8, wherein the microcontroller is further configured to receive a second monitoring signal indicating either one of a cessation of the fire alarm system or a second change of state in the primary power source from the off state to the on state, open the first and second control relays, switch the safety relay from the second connection to the first connection, and close the first and second control relays.

10. The device of claim 8, wherein the microcontroller is further configured to transmit a first control signal to open the first and second control relays.

11. The device of claim 10, wherein the microcontroller is further configured to transmit a second control signal to switch the safety relay.

12. The device of claim 8, wherein the primary power source comprises mains voltage and the secondary power source comprises a generator or an inverter.

13. The device of claim 8, wherein the first and second control relays each comprise a control relay coil actuating a control switch for allowing or preventing a current flow.

14. The device of claim 13, wherein the safety relay comprises a safety relay coil actuating a safety switch for allowing a current flow from the primary power source or a current flow from the secondary power source.

* * * * *